United States Patent [19]

Schaller

[11] Patent Number: 5,252,205
[45] Date of Patent: Oct. 12, 1993

[54] UNITARY CLARIFIER BAFFLE AND INTEGRATED BAFFLE SYSTEM

[76] Inventor: Earle Schaller, 784 Windermere Way, Palm Beach Gardens, Fla. 33418

[21] Appl. No.: 943,739

[22] Filed: Sep. 11, 1992

[51] Int. Cl.⁵ .............................................. B01D 21/00
[52] U.S. Cl. ..................... 210/232; 210/521; 210/525; 210/540; 210/541; 29/897
[58] Field of Search ............... 210/232, 513, 521, 525, 210/528, 538, 540, 532.1, 541; 220/4, 12, 565, 660; 29/897, 897.3; 52/745.05, 745.2, 748

[56] References Cited

U.S. PATENT DOCUMENTS

| | | | |
|---|---|---|---|
| 2,343,836 | 3/1944 | Weber | 210/528 |
| 3,497,892 | 1/1970 | McCann | 210/521 |
| 4,011,164 | 3/1977 | McGivern | 210/525 |
| 4,346,005 | 8/1982 | Zimmerman | 210/521 |
| 4,584,802 | 4/1986 | Casselman et al. | 220/565 |
| 4,780,206 | 10/1988 | Beard | 210/521 |
| 4,816,157 | 3/1989 | Jennelle | 210/521 |
| 4,847,926 | 7/1989 | Laputka | 220/565 |
| 5,049,278 | 9/1991 | Galper | 210/521 |
| 5,139,657 | 8/1992 | Nojima et al. | 210/521 |

*Primary Examiner*—Christopher Upton
*Attorney, Agent, or Firm*—Cohen, Pontani, Lieberman, Pavane

[57] ABSTRACT

A baffle system for use in a clarifier tank having a tank bottom, a periphery and a substantially vertical peripheral wall bounding the interior of the tank is formed by a plurality of individual and cooperatively-engageable baffles mounted on the peripheral tank wall. Each baffle includes a panel member that downwardly slopes from the peripheral tank wall toward the interior of the tank and the tank bottom and terminates at a lower ledge disposed in space relation above the tank bottom. A first lateral end of the panel member unitarily carries an end bracket securable to the peripheral wall for supporting the panel member in a cantilevered fashion. The plural baffles are disposed in end-to-end relation about the peripheral tank wall such that the second lateral end of the panel member of each baffle is secured to the end bracket of the next-adjacent baffle whereby each end bracket supports the panel members of each set of two immediately-adjacent baffles on the peripheral wall. The resulting baffle system provides a smoothly continuous, inwardly and downwardly sloping surface along which solids precipitated from the liquid-solid suspension contained in the clarifier tank are gravitationally-directed to the tank bottom.

22 Claims, 3 Drawing Sheets

UNITARY CLARIFIER BAFFLE AND INTEGRATED BAFFLE SYSTEM

FIELD OF THE INVENTION

This invention relates generally to a baffle and baffle system for use in a solids-precipitating clarifier tank, the baffle system consisting of a plurality of interengaged individual baffles secured to the clarifier tank peripheral wall.

BACKGROUND OF THE INVENTION

The present invention relates generally to a baffle device, also known in the art as a lamella gravity separator or settler, for use in a clarifier typically used in waste treatment for gravitationally separating suspended solids from solids containing carrier liquid or fluid suspensions. The clarifiers with which the inventive baffle device is used typically consist of a circular or rectangularly-configured tank in which a centrally mounted, radially-extending arm is slowly moved or rotated about the tank at or proximate the surface of the carrier liquid.

Specifically, in waste water treatment facilities utilizing secondary clarifiers, the clarifiers' effectiveness in removing solids is perhaps the most important factor in establishing the final effluent quality of the facility. A major deterrent to effective removal is the presence of sludge density currents which cause hydraulic short circuits within the tank. These short circuits, in turn, allow solids concentrations to unintendedly bypass the tanks' clarification volume and enter the effluent. Research has shown that a peripheral baffle attached to the tank wall and directed downward at an angle into the tank can effectively minimize these density currents and properly redirect the flow into the main clarification volume, thereby improving the solids removing efficiency of the clarifier by as much as 50% or more.

The present invention provides a baffle that is mounted in cantilevered fashion along a peripheral wall of the clarifier intermediate the tank bottom and the surface of the carrier liquid contained in the tank. The inventive baffle system includes a plurality of such baffles which are constructed as modular units and form a continuous, single-surface sheet that slopes downwardly from the peripheral tank wall toward the center of the tank and terminates at a free edge suspended in spaced relation above the tank bottom.

Each of these baffles has a unitarily-integrated design that incorporates a downwardly-sloping panel member and an end bracket integrally arranged with and depending from one lateral side or end of the panel member for securing the panel member to the inwardly-facing peripheral wall surface of the clarifier tank. The second or opposite lateral end of each baffle is secured to the end bracket of the immediately-adjacent and, thereby interengaged baffle in the baffle system. Accordingly, the baffle system of the invention provides and is formed by a plurality of interengaged baffles for use in a clarifier tank and which is mounted as a single, integrated unit, each such baffle unitarily incorporating both the panel member and the cantilever mounting structure or end bracket.

Numerous clarifier and baffle configurations are disclosed in the art. However, prior art attempts have suffered from a variety of various drawbacks and deficiencies.

For example, U.S. Pat. No. 4,780,206 to Beard et al. relates to a turbulence control system for an intra-channel clarifier which reduces turbulence within and allows the removal of sludge from the clarifier. However, there is no disclosure in the reference of an improved baffle system which is constructed as a modular unit and that consists of a plurality of interengaged individual baffles, each formed as a unitarily-integrated element incorporating both the panel member and an integral end bracket for suspended securement of the baffle to the peripheral wall of the clarifier tank.

U.S. Pat. No. 4,816,157 to Jennelle is directed to an apparatus and method for clarifying solids from a solids-containing liquid having a multilayer baffle system and integral solids removal sump. The multilayer baffle system includes a first set of baffles placed above the main liquid flow path for minimizing horizontal flow and creating local turbulence so as to promote settling and assure that no solids settle on the baffles. This reference, however, does not teach the use of a baffle system constructed as a modular unit consisting of a plurality of interengaged individual baffles with each baffle incorporating both the panel member and an integrated mounting flange.

U.S. Pat. No. 5,049,278 to Galper relates to a modular plate settler for use in a liquid clarifier system having one or more inlet ports for receiving an influent flow of liquid. The modular plate settler comprises a parallelogram-shaped enclosure provided with a full bottom opening for receiving the influent flow of liquid from the settling tank. This reference, however, does not teach an improved baffle system having a plurality of baffles with each baffle consisting of a unitarily-integrated design incorporating both the panel member and the end bracket for cantilevered securement of the baffle to the peripheral wall.

Thus, none of the prior art teaches or suggests unitarily-integrated clarifier baffle and baffle system comprising a plurality of interengaged baffles for use in a clarifier tank in accordance with the teachings of the present invention. Moreover, no prior art reference discloses a plurality of interengaged individual baffles with each baffle including a panel member sloping downwardly from the tank's peripheral wall toward the tank bottom and an end bracket unitarily depending from one lateral side or end of the panel member for securing the member to the peripheral inner wall of the clarifier tank, and with the opposite lateral end of each baffle being secured to the end bracket of a next-adjacent baffle so as to define the multi-element baffle system of the invention.

It is, therefore, an object of the present invention to provide a system of plural, interengaged baffles, curved to match the peripheral contour of a circular or arcuate tank or, alternatively, linear to match the peripheral walls of a noncircular tank, and which interlock to form a rigid peripheral "shelf" or baffle system inclined inward and downward around the entire periphery of the tank.

Another object of the invention is to provide an individual baffle panel formed as a unitary, a one-piece molded unit incorporating the panel member and the end bracket.

A further object of the invention is to provide a baffle system consisting of a plurality of individual baffles, which can be readily installed in a clarifier tank, and which significantly reduces both the manufacturing time and installation process as compared to other systems.

Another object of the invention is to provide an integral bracket designed to support the cantilevered panel member at an appropriate angle to the peripheral wall of the tank while presenting a minimal surface area so as to avoid unnecessary interference with the flow of liquid within the tank.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

SUMMARY OF THE INVENTION

In accordance with the invention a baffle system formed of a plurality of individual baffles, for use in a clarifier tank, is provided. The baffle system includes a plurality of interengaged individual baffles with each baffle having a unitarily integrated design incorporating both a panel member and an end-depending mounting bracket. The panel member slopes downwardly from the peripheral tank wall toward the tank bottom and defines a first lateral side end and a second lateral side end. The end bracket is integrally arranged at the first side end for securing the panel member to the radially inwardly facing peripheral wall of the clarifier tank. The second side end of each baffle is configured for preferably interlocked securement to the first side end of a next adjacently-located one of the plural baffles. In this way the inventive baffle system, which is mounted in cantilevered fashion along the peripheral wall of the clarifier tank intermediate the bottom of the tank and the surface of the contained liquid in the tank, forms a continuous single-surface sheet or "shelf" that slopes downwardly from the peripheral tank wall toward the center of the tank and terminates at a free edge suspended in spaced relation above the tank bottom.

The panel member can be further provided with a supplemental mounting flange along the top or upper edge of the member. The supplemental mounting flange may be unitarily formed along the upper edge of the panel member to thereby provide additional support and securement of the panel member to the peripheral wall of the clarifier tank. The panel member may also or alternatively be provided with a unitarily-integral ridgidizing flange depending from and extending along the lower edge of the panel member for providing additional structural strength thereto, particularly along the rigidizing flange, which serves as a stiffening member for the lower, only indirectly supported portion of the panel member. The rigidizing flange also contributes to deflection of density currents and redirection of liquid flow back into the central volume of the tank.

Thus, the baffle system of the present invention is mounted in a cantilevered fashion along the peripheral wall of the clarifier tank intermediate the bottom of the tank and the surface level of the contained liquid in the tank and forms a continuous, single-surface sheet that slopes downwardly from the peripheral tank wall toward the center of the tank and terminates at a free edge suspended outwardly from the peripheral wall and in spaced relation above the tank bottom.

In a currently preferred implementation, the individual baffles are fabricated from a molded reinforced fiberglass composite as one-piece, unitarily-integrated units. Thus, each molded baffle incorporates the panel member, the end bracket, the optional mounting flange and optional stiffeners in a single unit that, advantageously, enables significant reductions both in manufacturing time and for installation as compared to other, prior art arrangements and systems. Most preferably, the thickness of the fiberglass panels is in the range of from about 3/16th to ¼th of an inch, a range that provides substantial structural strength and rigidity while remaining sufficiently lightweight for unusual ease of installation.

A method of installing a system of interengaging baffles for use in a clarifier tank is also disclosed. The system includes at least a first baffle and a second baffle that are mountable in the clarifier tank. The first baffle is placed along the inner surface of the peripheral wall of the tank with the first baffle having a panel member sloping downwardly from the peripheral wall toward the tank bottom and an integral end bracket. Both panel members, which are identical, have a first lateral side end—from which the bracket depends—and a second lateral side end. As the second baffle is placed adjacent to and for interengagement with the first baffle along the peripheral wall of the clarifier, the second lateral side end of the adjacent second baffle engages the first side end of the first baffle and thus forms an integrated, substantially rigid peripheral single-shelf baffle system.

The invention accordingly describes the features and method of construction, the combination of elements and the arrangements of parts which will be exemplified in the embodiments hereinafter set forth, the scope of the invention being indicated by the appended claims.

BRIEF DESCRIPTION OF THE DRAWINGS

In the drawings, wherein like reference numerals denote similar elements throughout the several views.

DESCRIPTION OF THE PREFERRED EMBODIMENTS

A baffle system constructed in accordance with the present invention for use in a clarifier tank includes a plurality of interengaged, individual baffle members. Each baffle member has a unitarily integrated design incorporating both a sloping panel member and, at one lateral end of the panel, an integral end bracket for securement of the baffle to the peripheral wall of the clarifier tank.

The end bracket includes a shiplap-type recess for receiving the opposite lateral end of the next-adjacent baffle member unit and thereby providing a smoothly continuous connection to the adjacently-disposed panel.

Figure 1:
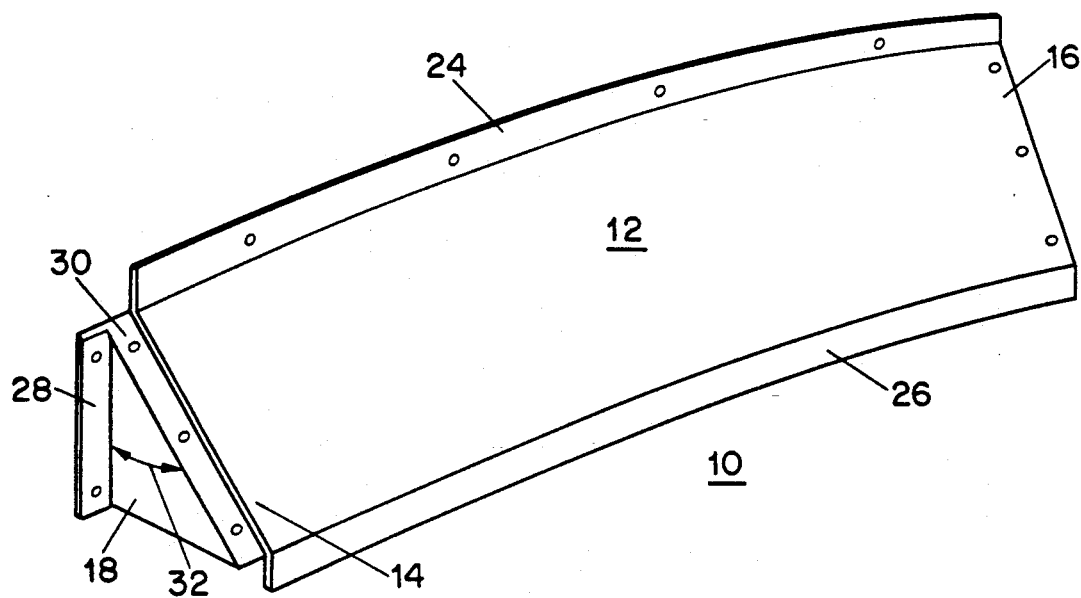
FIG. 1 is an elevated perspective view of a unitarily integrated baffle member constructed in accordance with the teachings of the present invention.
Figure 2:
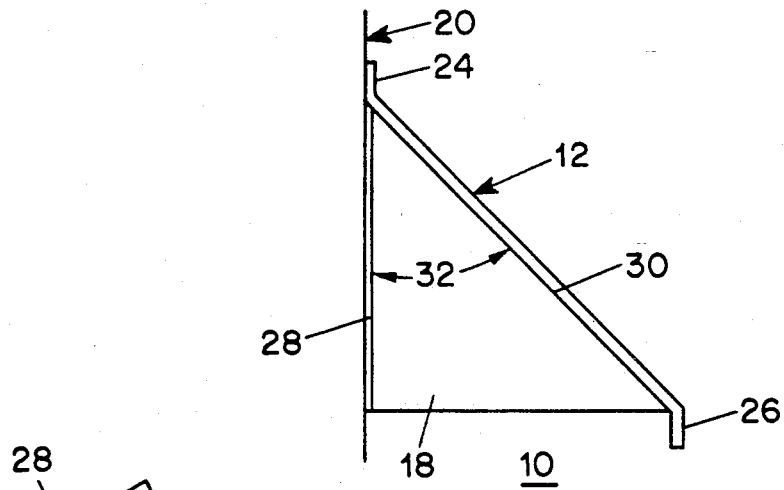
FIG. 2 is a cross-sectional side view of the baffle member shown in FIG. 1.

Referring specifically to FIG. 1 of the drawings, a preferred embodiment of a baffle member 10 in accordance with the invention includes a smoothly planar, downwardly sloping surface panel 12 having a first side lateral end 14 and a second lateral side end 16. The baffle 10 carries an end bracket 18 integrally depending from and, in the most preferred form, unitarily fabricated on the first end 14 of the panel 12 for securing the panel to the radially-inwardly facing surface of the peripheral wall 20 of a clarifier tank 22 (see FIG. 5). The second or opposite end 16 of the baffle 10 is adopted for securement to the end bracket 18 of a next-adjacent baffle member when a plurality of such baffles are interconnectedly engaged, as hereinafter described, to form a baffle system in accordance with the invention and, for that purpose, may have one or a plurality of bores defined therethrough for receiving rivets or like fasteners attaching the adjacent baffles one to the other.

The baffle 10 may also optionally include, along the top or upper edge of the panel 12, a supplemental mounting flange 24. The flange 24 may, as is preferred, be formed as a unitary extension of the upper edge of the panel 12 and may include a plurality of rivet or screw or fastener-receiving bores defined through and along the flange for securing the panel 12 to the peripheral wall 20 of the clarifier tank 22 along the top edge of the baffle. Thus, the mounting flange 24 is effective to provide added support for the baffle member 10 on and to the peripheral wall 20 of the clarifier tank. The baffle member 10 may also, or alternatively, optionally include a rigidizing flange 26 depending from the lower edge of the panel member 12. As with the supplemental flange 24, it is most preferred that the rigidizing flange 26 be fabricated as a unitary extension of the lower edge of the panel 12 for providing enhanced rigidity to the panel in a one-piece, fully integrated construction. The rigidizing flange 26 also contributes to deflection of density currents and redirection of liquid flow back into the central volume of the tank 22.

Figure 3:
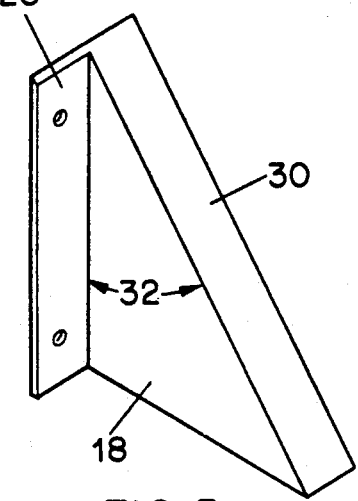
FIG. 3 is an elevated perspective view of a left end bracket of the baffle member of FIG. 1.

The preferred structural details of the end bracket 18 can perhaps best be appreciated by reference to FIG. 3 wherein the bracket is depicted separate from the baffle panel 12. Although the bracket 18 is there shown and may, of course, be formed as a separate element for attachment to the panel 12 during manufacture or subsequent installation of the baffle member 10, it should be understood that it is generally contemplated and most preferred that the end bracket be implemented as a unitary, nondetachable portion of the baffle. In any event, the end bracket 18 includes a mounting flange 28 having throughbores for receiving fastening hardware—such as rivets or screws or the like—by which the bracket 18 is secured to the tank wall 20, and a mounting surface 30 that depends from and connects the bracket to the first lateral end 14 of the panel 12. The surface 30 has an angled orientation or slope substantially identical to and following the orientation of the panel 12 and, in the preferred form of the end bracket 18, the surface 30 is recessed relative to the plane of the panel 12 by an amount generally conforming to the thickness of the panel 12. This construction, as will hereinafter become apparent, advantageously assures that the bracket system of the invention, when installed in a clarifier tank apparatus, provides a smoothly continuous sheet-like surface on and along which solids or particulate matter suspended in the liquid being treated may gravitationally descend to the tank bottom during the solids-precipitating operation of the clarifier apparatus.

Figure 4:
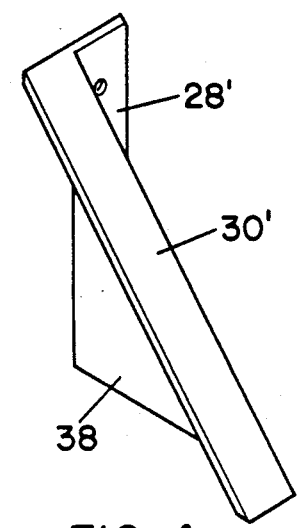
FIG. 4 is a perspective view of a supplemental right end bracket for use with the baffle member of FIG. 1.

The end bracket 18 of the inventive baffle member 10 is herein shown and described as being located in depending relation on the first lateral end 14 of the plate 12, as may for example be seen in FIG. 1. It is nevertheless also within the intended scope and contemplation of the invention that the end bracket instead be carried on the second or opposite lateral end 16 of the plate 12, for which purpose the bracket may be configured as a substantial mirror image of the bracket 18 of FIG. 3. Such an alternative or second end-mounted bracket, designated by the reference numeral 38, is illustrated by way of example in FIG. 4. Here, again, the end bracket 38 is depicted separate and apart from the remainder of the baffle 10 although, as is preferred and generally contemplated, the bracket 38 will generally be unitarily formed with and as an integral part of the baffle member 10.

Additionally, the sloping panel 12 and the mounting flange 28—which will generally be mounted against the substantially vertical wall 20 of the clarifier tank 22—have an angle 32 defined therebetween in the preferred range of about 35° to 65°. Most preferably, for most efficient operation of the baffle system, the angle 32 is approximately 45°. This angle, therefore, represents the slope or angular inclination of the panel 12 relative to the generally vertical wall 20 of the tank 22. It is, in any event, intended that the angular inclination of the panel 12 be selected so as to achieve the removal of suspended solids from the liquid being treated and to insure that the surface of the panel 12 operatively sheds solids and is therefore self-cleaning.

Figure 5:
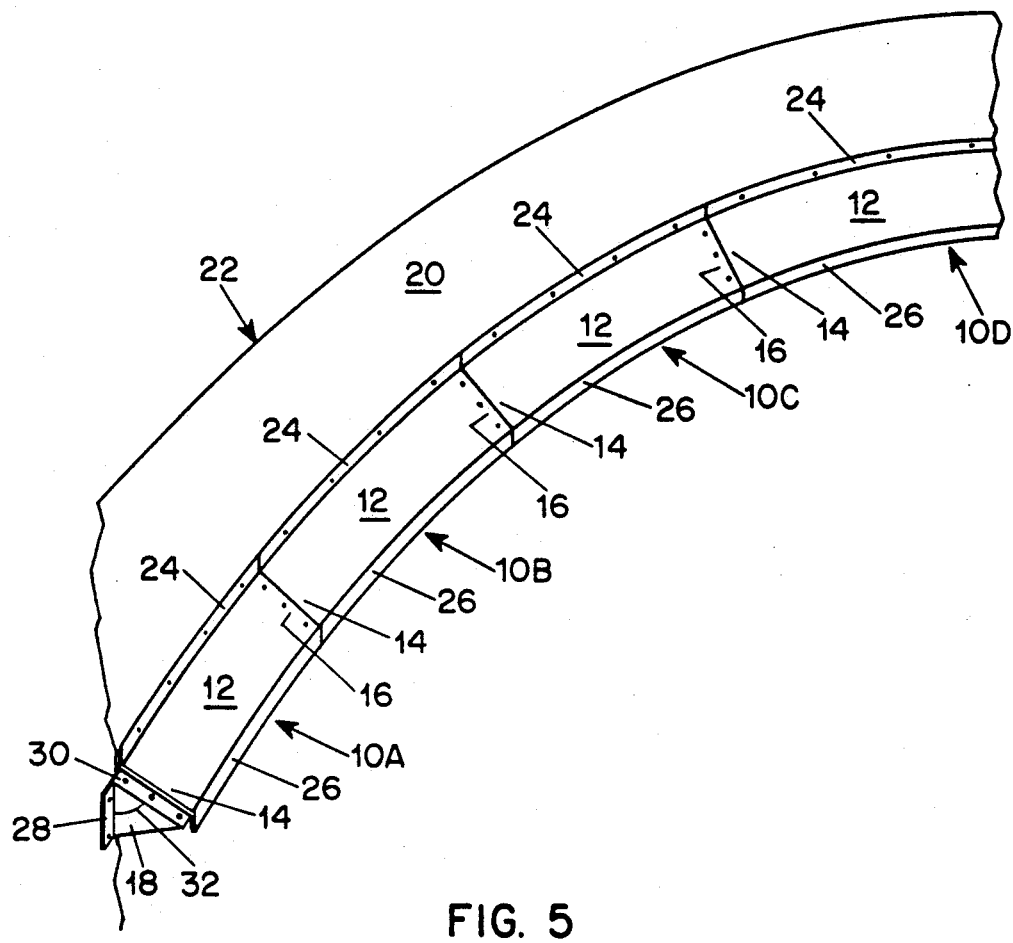
FIG. 5 is an elevated perspective view, partially broken away, of a plurality of baffle members arranged along the perimeter of an arcuately contoured clarifier tank.

The baffle system of the present invention is formed using a plurality of the individual baffle members 10 as will now be described with reference, by way of example, to FIG. 5. As should be apparent, the plural baffle members 10A, 10B, 10C, 10D are interconnected and attached in an end-to-end arrangement so that the panels 12 form a smoothly continuous, downwardly and inwardly (i.e. toward the center or central portion of the clarifying tank 22) sloping surface. The panels-defined sloping surface extends outwardly from the peripheral tank wall 20, to which the baffle members 10 are supportedly mounted, toward the tank bottom and terminates in spaced relation at a suitable distance from the tank bottom. Thus, the baffle panels 12 define a cantilevered surface supported through direct securement at its top to the tank wall 20 and through indirect attachment, by way of the end brackets 18, at intervals along the sloping surface as defined by the lateral ends of the baffle members 10.

Interconnection and securement of immediately-adjacent baffle members, as for example the baffles 10A and 10B (FIG. 5), during installation of the inventive baffle system is effected by attaching the second lateral end 16 of the baffle 10A to the end bracket 18 at the first lateral end 14 of the baffle 10B. More particularly, the second end 16 of the panel 12 of baffle 10A is received atop the mounting surface 30 of the end bracket 18 of baffle 10B. Because the mounting surface 30 is recessed by an amount substantially corresponding to the thickness of the panel 12, the panels 12 of the adjacently-abutting baffles 10A, 10B form a smoothly-continuous surface by virtue of the shiplap-type joint through which they are interconnected. At the same time, the end bracket 18 unitarily formed at and thereby supporting, on the wall 20, the first end 14 of the baffle member 10B concurrently serves to support the second end 16 of the baffle member 10A, thus providing sufficient support to the cantilevered sloping surface of the inventive baffle system to assure its effective intended utility in the clarifier apparatus. Moreover, the overlapping of the second end 16 of the panel 12 of the baffle 10A atop the recessed mounting surface 30 of the end bracket 18 of the baffle 10B prevents unintended leakage or passage of fine particulate matter through the connection between the immediately-adjacent baffles 10A, 10B. And, still further, this overlap advantageously permits appropriate adjustment, during installation of the inventive baffle system, of the relative positions of adjacently-disposed baffle members to compensate for unanticipated irregularities in the curvature or contour of the clarifier tank wall 20.

As should be further apparent, the individual baffle members 10 are additionally secured to the clarifier tank wall, as by rivets or screws or other fasteners or the like, at and through the mounting flange 28 and, when optionally present, the supplemental flange 24. Securement of the individual baffle members to the tank wall 20 may be effected as each baffle is attached to the next-adjacent baffle in the system, or after a plurality of baffle members have been connected one-to-another, or in a combination or mixture of such steps as a general matter of design choice.

Figure 6:
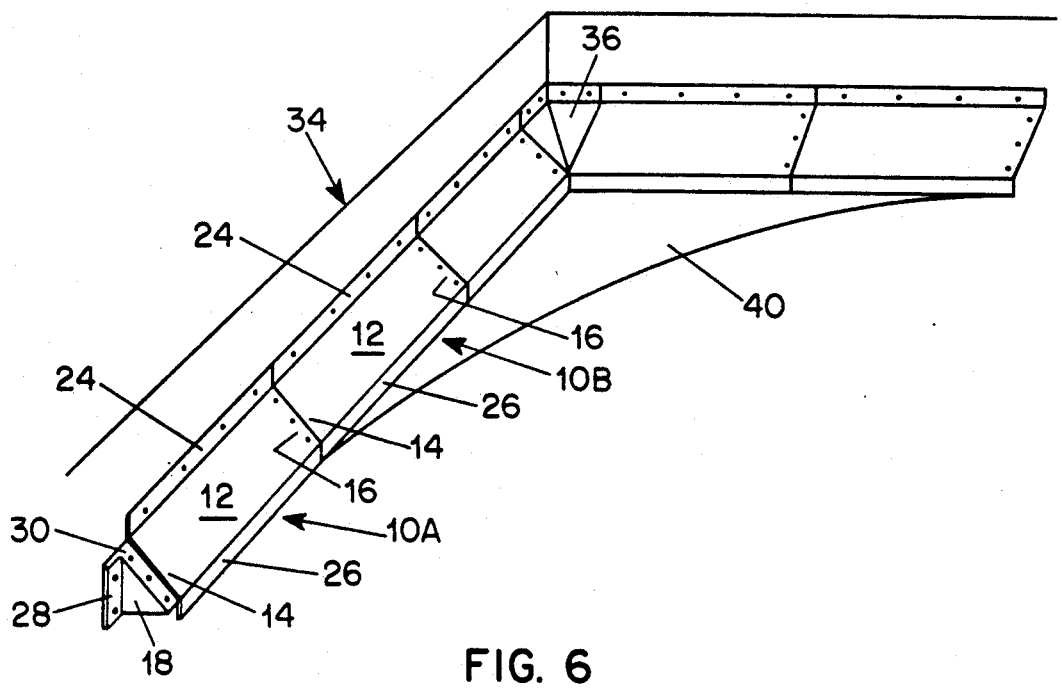
FIG. 6 is an elevated perspective view, partially broken away, of a plurality of baffle members arranged along the perimeter of a generally rectangular or nonarcuate clarifier tank.

The inventive baffle system as shown and described may be used in both arcuate and non-arcuate or rectangular clarifier tanks. When used in an arcuate—e.g. oval or circular—clarifier tank 22 and as shown in FIG. 5, the upper edge and supplemental flange 24 of the panel 12 are configured having a radius of curvature which conformingly corresponds to the curvature of at least that portion of the clarifier tank wall to which the particular baffle member 10 is to be mounted. The panel member 12 is likewise curved so as to follow the contour of the clarifier tank wall 20. When used in a non-arcuate clarifier tank having flat planar or uncurved wall sections as shown in FIG. 6, both the mounting flange 24 and the panel member 12 are configured so as to linearly correspond to the uncurved side wall 32 of the clarifier tank 34. In the latter situation, corner support brackets 36 may be provided for supporting and interconnecting the ends of the adjacent baffles 12 that butt up to the tank's corners. A corner extending member 40 may also be provided for accommodating the conventional centrally-mounted, radially-extending arm which moves in a circular manner about the tank for facilitating solids precipitation. Such corner extending members 40 notably increase the efficiency of operation in non-arcuate clarifier tanks.

It is presently preferred that each baffle member 10 be molded of a fiberglass composite or the like and has a thickness of about 3/16th to ¼th of an inch, although the baffles may alternatively be fabricated of any suitable moldable or formable material such as plastic, PVC, stainless steel or the like or, indeed, of any suitable construction material whether moldable or not. In this way, the panel 12, the end bracket 18, the supplemental mounting flange 24 and the rigidizing flange 26 may be unitarily formed as a single unit, as is most preferred, significantly reducing both manufacturing and installation time and difficulties as compared to prior art systems.

Figure 7:
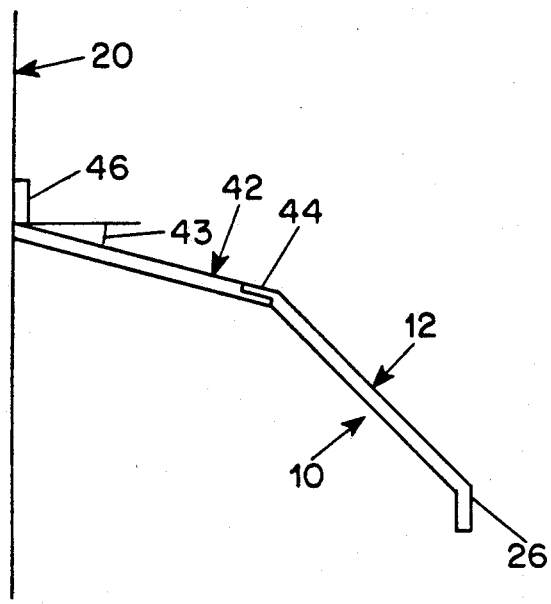
FIG. 7 is a cross-sectional side view of the baffle member of FIG. 1 incorporating an additional panel segment.

It should also be understood that while the preferred mounting configuration is to a substantially vertical peripheral wall of a clarifier tank, attachment of the inventive baffle member to a peripherally-disposed surface or to a launder channel may be employed herein without departing from the spirit and scope of the present invention. For example, FIG. 7 shows a cross-sectional view of the baffle member 10 (the end bracket 18 being omitted for convenience of illustration) of FIG. 1 mounted on an extension panel segment 42. The extension panel 42, which is located along and is preferably depended inwardly from the periphery of the clarifier tank wall 20, suspends the baffle further inwardly from the wall 20 so as to suitably position the sloped surface of the baffle with respect to the rotating clarifier mechanism (not shown). Preferably, the extension panel 42 is downwardly angled with the sum of the angles of the extension panel 42 and the baffle member 10 preferably approaching 45°, with the angle 43 of the extension panel 42 preferably about 15°. The baffle member 10 of the invention is secured to the extension panel 42 by way of a flange 44 (FIG. 7) that unitarily extends from the top of the panel 12. Such an arrangement further requires, as should be evident, that the end bracket 18 be of sufficiently increased depth or extension for supported connection of the baffle to the tank wall.

Figure 8A:
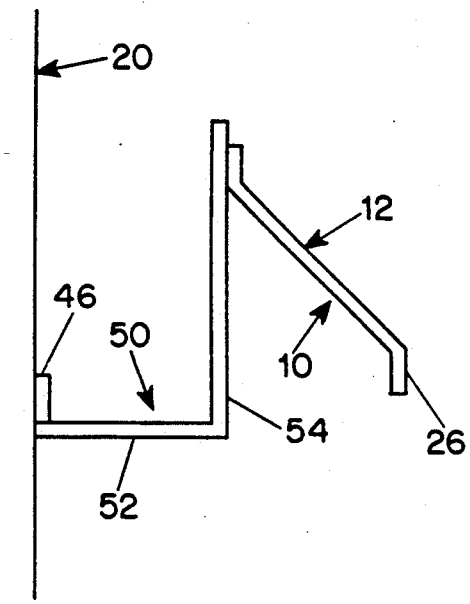
FIG. 8A is a cross-sectional view of the baffle member of FIG. 1 mounted on a vertical surface of a launder channel.
Figure 8B:
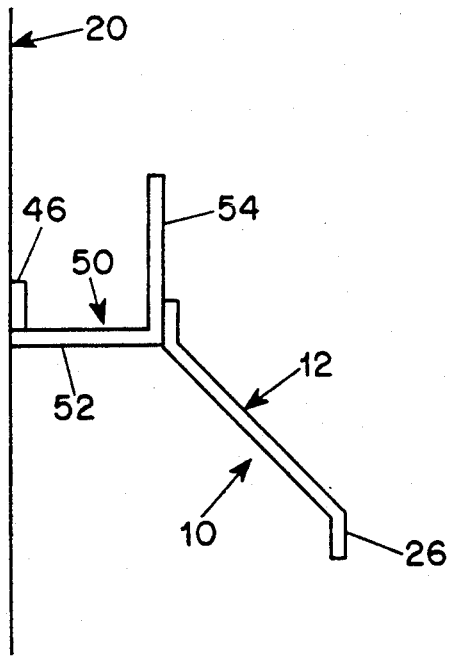
FIG. 8B is a cross-sectional view of the baffle member of FIG. 1 mounted at the intersection of the vertical surface and a horizontal surface of the launder channel.
Figure 8C:
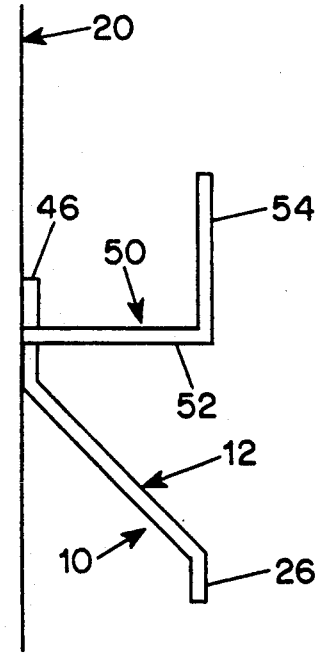
FIG. 8C is a cross-sectional view of the baffle member of FIG. 1 mounted underneath the lower horizontal surface of the launder channel.

As shown in FIGS. 8A, 8B and 8C, the present invention also provides for the mounting of the baffle system on, proximate to or underneath a launder channel 50 that may be provided along the periphery of the clarifier tank wall 20. The launder channel 50, has a substantially horizontal lower surface 52 and a substantially vertical vertical surface 54 substantially perpendicular to the lower surface 52. As shown in FIGS. 8A, 8B, and 8C, the baffle 10 can be mounted anywhere on vertical surface 54 of the launder channel 50 (FIG. 8A), at the intersection of the horizontal lower surface 52 and the vertical surface 54, (FIG. 8B) or underneath the horizontal lower surface 52 (FIG. 8C).

Additionally, where such a launder 50 is not already a part of the clarifier tank construction but is, instead, merely required for effective installation or operation of the baffle system, the launder 50, end bracket 18 and the panel member 12 are preferably unitarily fabricated as an integral, one-piece molded fiberglass composite, with the launder 50 being secured by a mounting flange 46 or other suitable arrangement to the peripheral wall 20.

While there have been shown and described and pointed out fundamental novel features of the invention as applied to preferred embodiments thereof, it will be understood that various omissions and substitutions and changes in the form and details of the device illustrated, and in its operation, may be made by those skilled in the art without departing from the spirit of the invention. It is the intention, therefore, to be limited only as indicated by the scope of the claims appended hereto.

What is claimed is:

1. A baffle system in a clarifier tank having a tank bottom and a periphery and a substantially vertical peripheral wall bounding the interior of the tank, said baffle system comprising:
   a plurality of baffles mounted on the peripheral wall of the clarifier tank, each said baffle comprising:
      a panel member downwardly sloping from the peripheral tank wall toward the interior of the tank and the tank bottom and terminating at a lower edge disposed in spaced relation to the tank bottom, said panel member having a first lateral side and a second lateral side; and
      an end bracket unitarily depending from said first lateral side of said panel member for securing said panel member to the peripheral wall of the clarifier tank;
   said plural baffles being secured together in end-to-end relation such that the second lateral side of the panel member of each of said plural baffles is secured to said end bracket of a next-adjacent one of said plural baffles to form a baffle system extending about the periphery of the clarifier tank.

2. The baffle system of claim 1, wherein said panel member has an upper edge, each said baffle further comprising a mounting flange integrally extending from said upper edge of said panel member and secured to the peripheral wall for securing said panel member to the peripheral wall of the clarifier tank.

3. The baffle system of claim 2, wherein the peripheral wall of the clarifier tank has a radius of curvature, and wherein said panel member upper edge has a radius of curvature which corresponds to the radius of curvature of the clarifier tank.

4. The baffle system of claim 1, each said baffle further comprising a rigidizing flange unitarily depending from said lower edge of said panel member for providing enhanced rigidity to said panel member.

5. The baffle system of claim 1, wherein said end bracket further comprises a mounting flange securable to the peripheral tank wall in surface-to-surface engagement for securing said end bracket to the peripheral wall, and a mounting surface for receiving the first lateral side of the panel member of a next-adjacent one of said plural baffles so as to secure together adjacent ones of said baffles in end-to-end relation.

6. The baffle system of claim 5, wherein said panel member defines a smoothly continuous plane and said mounting surface of said end bracket is recessed from said plane so that when the first lateral side of a panel member of one of said plural baffles is secured to said end bracket of a next-adjacent one of said plural baffles, the panel members of said one and next-adjacent baffles together form a smoothly-continuous downwardly, sloping surface.

7. The baffle system of claim 5, wherein said panel member and said mounting flange define therebetween an angle in the range of about 35 degrees to about 60 degrees.

8. The baffle system of claim 7, wherein said angle is about 45 degrees.

9. The baffle system of claim 1, wherein the peripheral wall of the clarifier tank has a radius of curvature, wherein said panel member has an upper edge, and wherein said panel member upper edge has a radius of curvature which corresponds to the radius of curvature of the clarifier tank.

10. The baffle system of claim 1, wherein the clarifier tank peripheral wall defines a substantially rectangular interior of the clarifier tank and the clarifier tank includes corner areas, said baffle system further comprising a corner support bracket for securedly supporting said panel member at one of said corner areas.

11. The baffle system of claim 1, wherein each said plural baffle is unitarily molded of a reinforced fiberglass composite.

12. The baffle system of claim 1, wherein said panel member has a thickness of about 3/16ths to about ¼th of an inch.

13. The baffle system of claim 1, wherein said panel member includes an top portion most remote from the tank bottom, said baffle system further comprising an intermediate panel segment extending from the peripheral wall of the clarifier tank between the peripheral wall and the top portion of the panel member of at least one of said plural baffles, said intermediate panel segment integrally depending from the top portion of said panel member for positioning said panel member in predeterminately-spaced relation to the clarifier tank peripheral wall, said intermediate panel segment including means for securing said panel segment to the peripheral wall.

14. The baffle system of claim 1, wherein said baffle system further comprises a launder channel mounted on the peripheral wall of the clarifier tank with said plurality of baffles mounted underneath said launder channel.

15. A baffle in a clarifier tank for gravitationally separating solids suspended in a liquid contained in the tank, the clarifier tank having a tank bottom and a substantially vertical peripheral wall bounding the liquid-containing interior of the tank, said baffle comprising:
   a panel member downwardly sloping from the peripheral tank wall toward the interior of the tank and the tank bottom, said panel member extending downwardly from an upper edge secured to the peripheral tank wall to a lower edge disposed in spaced relation to the tank bottom, and said panel member having a first lateral side and a second lateral side; and
   an end bracket unitarily integral with said first lateral side of said panel member for supportingly securing said panel member to the peripheral wall of the clarifier tank, said end bracket having a mounting surface for supportingly receiving the second end of the panel member of another said baffle located in immediately-adjacent relation to said baffle along the peripheral tank wall.

16. The baffle of claim 15, said baffle further comprising a mounting flange unitarily extending from said upper edge of said panel member for securing said panel member to the peripheral wall of the clarifier tank.

17. The baffle of claim 15, said baffle further comprising a rigidizing flange unitarily extending from said lower edge of said panel member for providing enhanced rigidity to said panel member.

18. The baffle of claim 15, wherein said end bracket further comprises a mounting flange for surface-to-surface securement to the peripheral tank wall, said mounting flange and said panel member having an angle defined therebetween in the range of about 35 degrees to about 60 degrees.

19. A baffle system in a clarifier tank for gravitationally separating solids suspended in a liquid contained within the tank, the clarifier tank having a tank bottom, a periphery, a substantially vertical peripheral wall bounding the interior of the tank, and a launder depending from and extending inwardly from the peripheral tank wall, said baffle system comprising:
  a plurality of baffles, each said baffle comprising:
    a panel member downwardly sloping from the peripheral tank wall toward the interior of the tank and the tank bottom, said panel extending from an upper edge to a lower edge disposed in spaced relation to the tank bottom, and said panel member having a first lateral side and a second lateral side;
    an end bracket unitarily depending from said first lateral side of said panel member for securing said panel member to the peripheral wall of the clarifier tank and to the panel member second end of another of said plural brackets disposed immediately-adjacent thereto; and
    means on said panel member proximate said upper edge of the panel member for securing said panel member to the launder depending from the peripheral wall of the clarifier tank.

20. The baffle system of claim 19, further comprising a rigidizing flange unitarily depending from said lower edge of said panel member for providing enhanced rigidity to said panel member.

21. The baffle system of claim 19, wherein said means comprises a mounting flange unitarily extending from said upper edge of said panel member.

22. A method of installing a baffle system in a clarifier tank having a tank bottom, a periphery and a substantially vertical peripheral wall bounding the interior of the tank, comprising the steps of:
  securing to the peripheral tank wall a first baffle having a panel member including a first lateral end and a second lateral end and downwardly sloping from the peripheral tank wall toward the interior of the tank and the tank bottom and terminating at a lower edge disposed in spaced relation to the tank bottom, and an end bracket unitarily depending from the first lateral end of the panel member for securing the panel member to the peripheral tank wall; and
  securing a second baffle to the peripheral wall and, in end-to-end immediately-adjacent relation therewith, to said first baffle, the second baffle including a first lateral end and a second lateral end and downwardly sloping from the peripheral tank wall toward the interior of the tank and the tank bottom and terminating at a lower edge disposed in spaced relation to the tank bottom, and an end bracket unitarily depending from the first lateral end of the panel member of the second baffle for securing first lateral end of the second baffle panel member to the peripheral tank wall, so that said second baffle is supportedly secured to the peripheral wall by the end bracket of the second baffle at the first lateral end of the second baffle and by the end bracket of the first baffle at the second lateral end of the second baffle.

* * * * *